F. MÜLLER.
ELECTRIC WELDING MACHINE.
APPLICATION FILED DEC. 23, 1911. RENEWED JAN. 28, 1915.
1,151,706.
Patented Aug. 31, 1915.
2 SHEETS—SHEET 1.
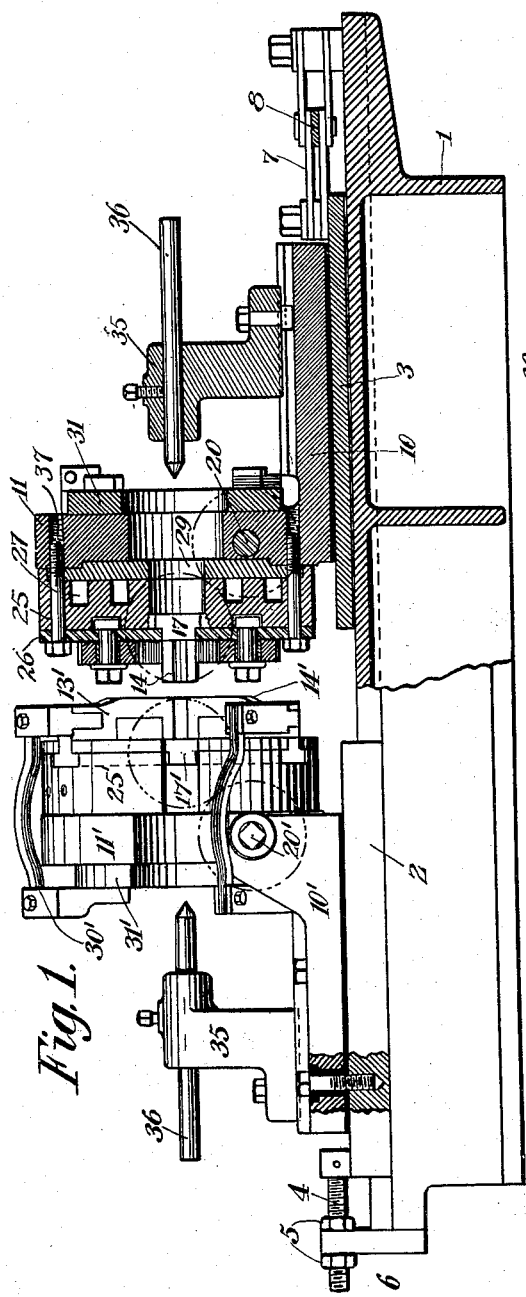
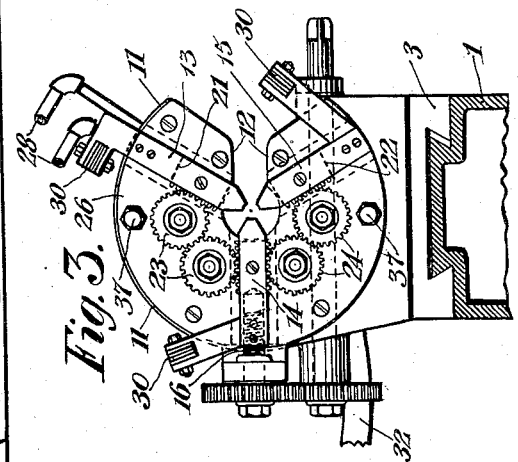
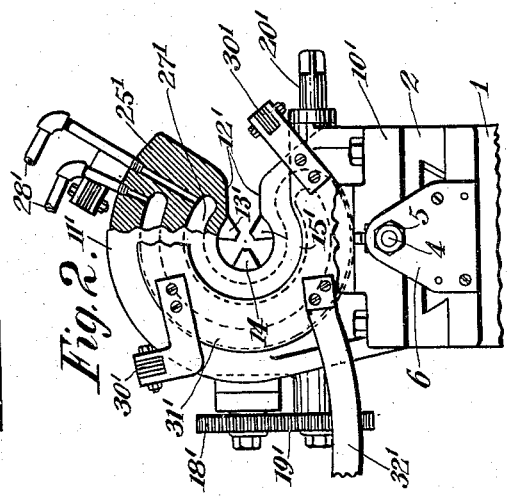
Witnesses:
F. H. Elliott
R. R. Murphy
Inventor:
Friederich Müller
by Jo. H. Freeman
Atty.

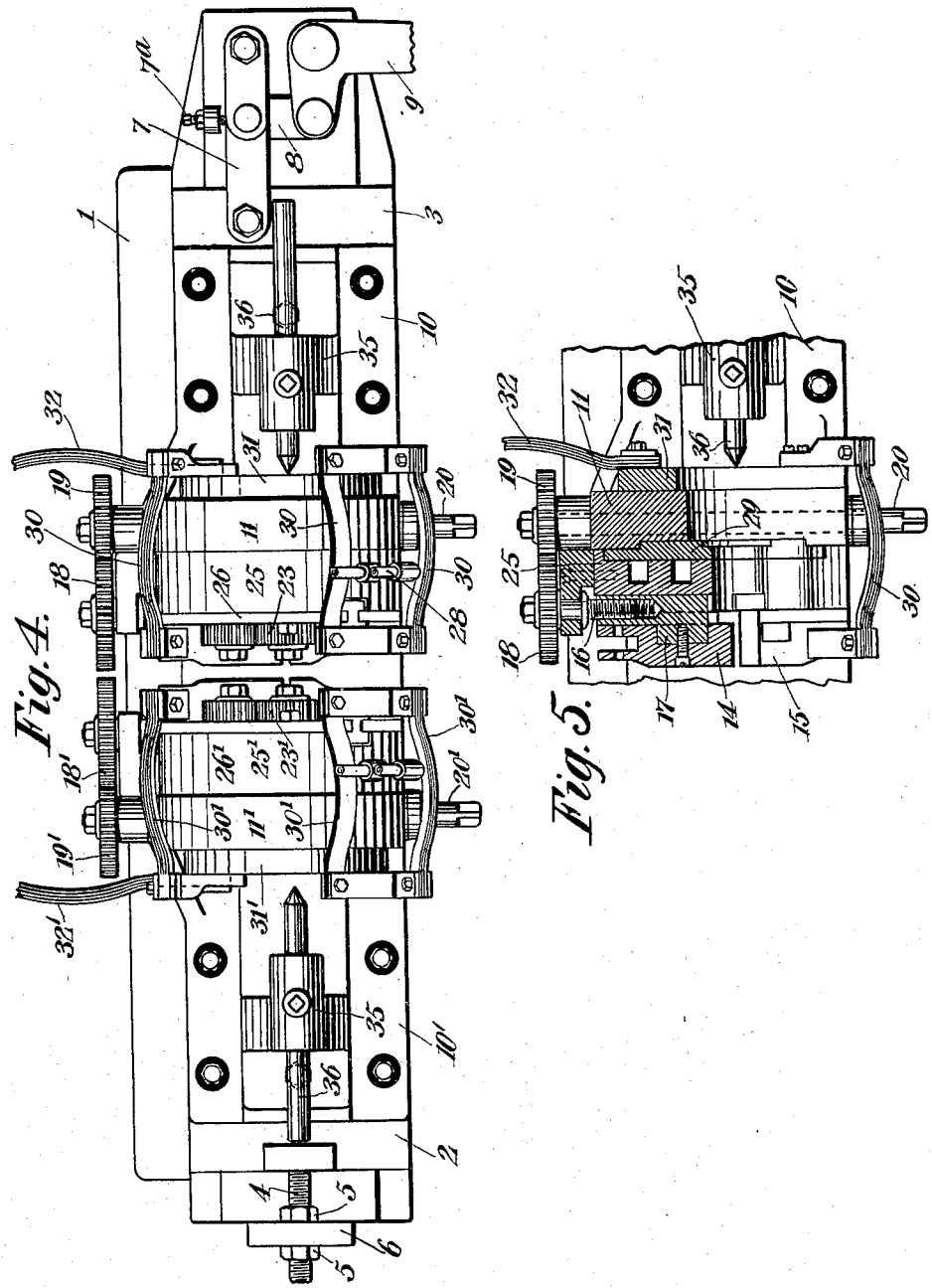

UNITED STATES PATENT OFFICE.

FRIEDERICH MÜLLER, OF HARTFORD, CONNECTICUT, ASSIGNOR TO PRATT & WHITNEY COMPANY, OF HARTFORD, CONNECTICUT, A CORPORATION OF NEW JERSEY.

ELECTRIC WELDING-MACHINE.

1,151,706.

Specification of Letters Patent.

Patented Aug. 31, 1915.

Application filed December 23, 1911, Serial No. 667,517. Renewed January 28, 1915. Serial No. 4,953.

*To all whom it may concern:*

Be it known that I, FRIEDERICH MÜLLER, a citizen of the United States, and a resident of Hartford, county of Hartford, State of Connecticut, have invented certain new and useful Improvements in Electric Welding-Machines, of which the following is a specification.

This invention relates to a machine for welding by electricity.

While the invention as to some of its features may be applied to other purposes, it is particularly addressed to machines for butt welding round pieces of work, such as the welding of shanks to drills, taps, and the like.

The invention has for an object to provide mechanism for accurately centering the pieces of work at both ends, applying longitudinal pressure thereto and conducting the current to the work in a uniformly distributed manner so as to secure an efficient and even heating thereof, whereby after the pieces have been welded and cooled they will be in accurate alinement with each other.

The invention also has for an object to provide a mechanism adapted to accommodate work varying in length and diameter through wide limits, provision being made for the ready insertion and removal of the work without changing any of the adjustments of the parts and at the same time providing for the ready and accurate adjustment of the parts, as required to apply the proper degree of end pressure and secure the proper location of the electrodes with relation to the ends to be united, having regard to variations of diameter of the work, the conductivity of the metal, etc.

The invention also contemplates the provision of means whereby the electrodes may be readily changed when worn or injured and whereby the electrodes and their connected parts may be efficiently cooled.

These and other objects of the invention will be in part obvious and in part more fully explained in the following description.

The invention consists in the novel parts, improvements, and combinations herein shown and described.

In the accompanying drawings is illustrated one embodiment of the invention, the same serving in connection with the description to explain the principles of the invention.

Of the drawings: Figure 1 is a side elevation, partly in section, of a machine constructed in accordance with my invention; Fig. 2 is an end elevation of the machine as seen from the left in Fig. 1, parts being broken away or shown in section more clearly to illustrate the details; Fig. 3 is a vertical central section of the machine, certain parts being shown in elevation; Fig. 4 is a plan view; and Fig. 5 is a sectional plan of a part of the machine illustrating certain details.

Referring now in detail to the particular embodiment of the invention illustrated, it will be seen that the machine comprises a main support or frame 1 having a machined upper surface forming a track or way for a pair of secondary supports or carriages 2 and 3. These secondary supports respectively carry the devices coöperating with the two pieces to be welded and are mounted for independent longitudinal movement upon the frame, and means are provided for effecting a relative movement between these members as required to apply end or longitudinal pressure to the work and to release the same. In the embodiment illustrated the support 2 is adjustably fixed upon the frame by any suitable means, such as a screw 4 fixed at one end to the member 2 and provided with a pair of nuts 5 adapted to engage the opposite sides of a bracket 6 secured at the end of the frame 1. The relative longitudinal movement may be effected in various ways. As shown, a toggle 7 is pivoted at one end to the frame and at the other end to the member 3, and this toggle is connected by a link 8 with a hand lever 9 suitably pivoted on the frame. An adjustable stop 7ª is preferably provided to determine the limit of the pressure-applying movement of the toggle so that the same compressing movement may always be applied to pieces of the same length.

Devices of various forms may be provided for coöperation with the pieces to be welded so far as some of the features of the invention are concerned. In the embodiment illustrated, however, each of the secondary supports is provided with a member for applying longitudinal or endwise pressure to the work, and a member for effecting electrical contact with the work, these members being normally fixed with relation to each other lengthwise of the work, but relatively adjustable to accommodate pieces of different lengths.

The electrical contact members are preferably and as shown fixed upon the secondary carriages since the necessary relative adjustment of these members is comparatively slight and may be effected by the adjustment of the secondary support 2 with relation to the range of movement of the secondary support 3.

In the construction illustrated the electrical contact member for the support 3 comprises a body portion 10 bolted to but insulated from the support 3, said body portion having a standard 11 provided with a central opening to receive the work and carrying the electrodes. In order to permit the insertion and removal of the work and to accommodate work of different diameters, the electrodes are mounted for radial movement to and from the axial line of the work, and the standard is provided at its front side with a radial opening 12 through which the work may be introduced and removed in a lateral direction.

Any suitable number of electrodes adapted to evenly distribute the current through the work may be employed. Preferably and as shown, three electrodes 13, 14, and 15 are employed, these being mounted for radial movement and equally spaced about the axial line of the work. Any suitable means may be employed for moving the electrodes into and out of contact with the work but in the preferred construction the electrodes are connected for equal simultaneous movement so that they will have a self-centering action upon the work. As shown, the means for moving the electrodes comprises a screw 16 which is threaded, as best shown in Fig. 5, in a slide member 17 forming the support for the electrode 14. The screw may be operated in any convenient way, as by the gears 18 and 19, respectively mounted upon the screw and upon a shaft 20, which is jouraled in the standard 11 and is provided at its forward end with a square end to receive a suitable wrench or hand wheel. The motion of the slide 17 is transmitted to similar sides 21 and 22 for the respective electrodes 13 and 15 by racks formed on the respective slide members, said racks being connected by intermediate gears 23 and 24, as clearly shown in Fig. 3. For convenience of construction the slide members 17, 21, and 22 are mounted in ways formed in a part 25 and are held in these ways by a plate 26, these two pieces being bolted by bolts 37 to the side of the standard 11, as clearly shown at the right in Fig. 1. The plate 26, also, froms a support for the studs upon which the gears 23 and 24 are mounted.

For the purpose of keeping the electrodes properly coiled when the machine is in continuous operation, the part 25 is preferably provided with passages 27 in which water or other cooling fluid may be circulated by means of suitable pipe connections 28. For convenience of construction the passages 27 are formed as grooves in the side of the part 25 and are closed by a plate 29 which is clamped between the part 25 and standard 11, as clearly shown in Figs. 1 and 5.

It will be observed that the electrodes are detachably secured, as by means of screws, to their respective slides so that they may be readily detached for repair or replacement by others, when unduly worn or injured, or when it is necessary or desirable to change the form of the contact surfaces. These electrodes are also detachably connected with suitable current distributing means. As shown, each electrode is detachably bolted to a flexible conductor 30 and these in turn are connected with a curved or annular conductor 31, which is preferably formed of copper of ample dimensions and is in turn connected with one pole 32 of the main circuit.

It will be understood that the electrical contact member of the secondary support 2 may be and, as shown, is identical in construction with that just described except that the parts, where necessary, will be of the reverse hand or, say, left-handed instead of right-handed. The parts of the electrical contact member for the support 2 are accordingly designated by the same reference numbers in the drawings with the addition of a prime.

The members for applying longitudinal pressure to the two ends of the work may be and as shown are duplicates, these members comprising standards 35 which for convenience are mounted upon the body portions 10 and 10' of the contact members and are adjustable longitudinally thereof to accommodate pieces of work of different lengths. Any suitable means may be provided to effect a connection between these standards and the opposite or outer ends of the work. Preferably, such connecting means should be adapted to center the outer or remote ends of the work on the same axis that the inner or proximate ends of the pieces of work are centered by the electrodes. As shown, the connection between each standard and the corresponding end of the work is effected by a pointed member or dead center 36 which is adjustable longitudinally with relation to its standard to further vary the capacity of the machine as regards the length of the work which may be accommodated thereby.

It will be seen that each blank is centered, in the illustrated machine, by two means, first, the multiple electrode, as 13—14—15, and, second, the dead center 36, the latter also giving to the blank longitudinal pressure or resistance during the welding.

The operation of the machine will be understood by those skilled in the art from the description of the construction already given. The advantages of the machine will also be obvious, but among these may be mentioned the fact that each end of each of the two pieces of work to be united will be accurately centered automatically with the axes coincident, and both ends of each piece will be reliably supported by members having no relative movement so that the character of the electrical contact will not be changed during the heating and welding process, and at the same time the contact surfaces will be subject to a minimum of strain and wear. The work may be placed in position and removed in a lateral direction and without shifting the position of the members for applying end pressure which is of great advantage where a number of exactly similar or duplicate welding operations are to be performed.

The invention in its broader aspects is not limited to the precise construction shown, as the same may be varied in details without departing from the main principles of the invention and without sacrificing its chief advantages.

I claim:

1. An electric welding machine including in combination, a main support or frame, a pair of secondary supports one for each of the two pieces of work to be united, each of said secondary supports carrying in normal fixed relation to the work a member for applying longitudinal pressure to the work and a member for effecting electrical contact with the work, said contact members being located between said pressure-applying members and provided with openings to permit the removal in a lateral direction of the work from between the pressure-applying members, and means for effecting a relative movement between said secondary supports, substantially as described.

2. An electric welding machine including in combination, a main support or frame, a pair of secondary supports one for each of the two pieces of work to be united, each of said secondary supports carrying in normal fixed relation to the work a member for applying longitudinal pressure to the work and a member for effecting electrical contact with the work, said contact members being located between said pressure-applying members and provided with openings to permit the removal in a lateral direction of the work from between the pressure-applying members, and both the pressure-applying and the contact members being constructed to center the pieces of work with relation to a common axis, and means for effecting a relative longitudinal movement between said secondary supports, substantially as described.

3. An electric welding machine including in combination, a main support or frame, a pair of secondary supports one for each of the two pieces of work to be united, a pair of members carried respectively by said secondary supports for effecting electrical contact with the work, each of said contact members comprising an open-sided standard and a plurality of electrodes mounted on said standard and connected for simultaneous movement to and from the axial line of the work, means for moving the electrodes to clamp and release the work, and current-distributing means having flexible connections with each of said electrodes.

4. An electric welding machine including in combination, a main support or frame, a pair of secondary supports one for each of the two pieces of work to be united, means for effecting a relative movement between said secondary supports, a pair of members respectively carried by said secondary supports for applying longitudinal pressure to the two pieces of work to be united, a pair of members respectively carried by said secondary supports for effecting electrical contact with the work, said contact members being located between said pressure-applying members and each comprising an open-sided standard, a plurality of electrodes mounted on said standard and connected for simultaneous movement to and from the axial line of the work, means for moving said electrodes to clamp and release the work, and current-distributing means having flexible connections with each of said electrodes.

5. An electric welding machine including in combination, a pair of members for applying longitudinal pressure to the two pieces of work to be united, a pair of members for effecting electrical contact with the work, said contact members being located between said pressure-applying members and provided with openings to permit the removal in a lateral direction of the work from between the pressure-applying members.

6. An electric welding machine including in combination, a pair of members for centering and applying longitudinal pressure to the remote ends of the two pieces of work to be united, a pair of members for effecting electrical contact with and centering the proximate ends of the two pieces of work, said contact members being located between said pressure-applying members and normally fixed with relation thereto and provided with openings to permit the removal in a lateral direction of the work from between the pressure-applying members.

7. An electric welding machine including in combination, a pair of members for centering and applying longitudinal pressure to the remote ends of the two pieces of work to be united, a pair of members for effecting electrical contact with and centering the proximate ends of the two pieces of work, said contact members being located between said pressure-applying members and each comprising an open-sided standard, a plurality of electrodes mounted on said standard and connected for equal simultaneous movement to and from the axial line of work, means for moving the electrodes to clamp and release the work, and current-distributing means having flexible connections with each of said electrodes.

8. An electric welding machine including in combination, a member for effecting electrical contact with the work, said member comprising a support having an opening at one side and a plurality of electrodes mounted on said support and connected for equal simultaneous movement toward the axial line of the work.

9. An electric welding machine including in combination, a main support or frame, a pair of secondary supports one for each of the two pieces of work to be united, each of said secondary supports carrying in normal fixed relation to the work two spaced-apart members, the first member for applying longitudinal pressure to the work and the second member for effecting electrical contact with the work, and means for effecting a relative movement of at least one of said secondary supports with its pressure applying member and its contact member longitudinally of the other secondary support during the welding.

10. An electric welding machine including in combination, a main support or frame, a pair of secondary supports one for each of the two pieces of work to be united, a pair of members carried respectively by said pair of secondary supports for applying longitudinal pressure to the two pieces of work to be united, a pair of members respectively carried by said pair of secondary supports for effecting an electrical contact with the work, said contact members being located between said applying members and normally fixed with relation to the work, means for varying the position upon the main frame of one of said supports and the two members carried by it, and means for moving longitudinally of the said support the other of said supports and the two members carried by it.

11. An electric welding machine including in combination, a pair of members for effecting electrical contact with the two pieces of work to be united, said contact members being provided with openings to permit the removal in a lateral direction of the work, and a series of converging contacts movable toward each other to center the work and from each other to extract the work.

12. An electric welding machine including in combination, a pair of generally cylindrical members for effecting electrical contact with the two pieces of work to be united, and means for effecting relative longitudinal movement between them, each of said contact members being provided with longitudinal openings to permit the removal in a lateral direction of the work, also C-shaped interior water passages, means for circulating therein a cooling fluid, and means for centering and holding the work centrally of said members.

13. An electrical welding machine including in combination, a member for effecting electrical contact with one of the pieces to be welded, said member comprising a plurality of electrodes connected for equal simultaneous movement toward the axial line of the work, and means for together moving said member, said electrodes and said piece of work during the welding.

14. An electrical welding machine including in combination, a member for effecting electrical contact with one of the pieces to be welded, said member comprising a plurality of electrodes connected for equal simultaneous movement toward the axial line of the work for centering and contacting the work, and from the work sufficiently to permit lateral removal thereof, and means for together moving said member, said electrodes and said piece of work during the welding.

15. An electrical welding machine including in combination, a pair of members for centering and applying longitudinal pressure to the remote ends of the two pieces of work to be united, a pair of members for effecting electrical contact with and centering the proximate ends of the two pieces of work, said contact members being located between said pressure-applying members and each comprising a plurality of electrodes connected for equal simultaneous movement toward the axial line of the work, and means for together moving one of said pressure members, its corresponding contact member, and the corresponding piece of work during the welding.

16. An electric welding machine including in combination, a first support having means for supporting a piece of work, a second support, a dead center carried on the second support located to contact the rear of the second piece of work, and a contacting member also carried by said second support comprising converging electrodes adapted to center and contact the work, said electrodes and dead center located to maintain the second piece of work in line with the first.

17. An electric welding machine including in combination, a first support having means for supporting a piece of work, a second support, a dead center carried on the second support located to contact the rear of the second piece of work, a contacting member also carried by said second support comprising converging electrodes adapted to center and contact the work, said electrodes and dead center located to maintain the second piece of work in line with the first, means for adjusting one of said supports longitudinally and fixing it, and means for moving the other support longitudinally during welding.

18. An electric welding machine including in combination, a first support having means for supporting a piece of work, a second support, a dead center carried on the second support located to contact the rear of the second piece of work, a contacting member also carried by said second support comprising converging electrodes adapted to center and contact the work, said electrodes and dead center located to maintain the second piece of work in line with the first, means for adjusting the first one of said supports longitudinally and fixing it, and means for moving the other support longitudinally during welding.

In testimony whereof, I have signed my name to this specification, in the presence of two subscribing witnesses.

FRIEDERICH MÜLLER.

Witnesses:
R. R. MURPHY,
WM. J. DOLAN.

Copies of this patent may be obtained for five cents each, by addressing the "Commissioner of Patents, Washington, D. C."